United States Patent
Dodd et al.

[11] Patent Number: 5,867,093
[45] Date of Patent: Feb. 2, 1999

[54] COMMUNICATION SYSTEM FOR VEHICLES WITH AERIAL INCORPORATED IN STEERING WHEEL

[75] Inventors: Harold Dodd, Blyth, England; Brian John Stanier, Stockton on Tees, United Kingdom

[73] Assignee: Identec Limited, Durham, England

[21] Appl. No.: 942,020

[22] Filed: Oct. 1, 1997

[51] Int. Cl.⁶ .................................................. G09F 9/00
[52] U.S. Cl. ..................... 340/461; 340/426; 340/438; 340/539; 340/825.54; 340/825.69; 340/825.72; 343/712; 343/713; 455/66; 455/90
[58] Field of Search ................................. 340/425.5, 426, 340/438, 441, 447, 539, 825.5, 825.69, 825.72, 461, 459; 343/712, 713, 741; 455/41, 66, 550, 575, 90, 95, 128, 129, 269, 347, 451; H01Q 1/32

[56] References Cited

U.S. PATENT DOCUMENTS

| | | | |
|---|---|---|---|
| 4,491,844 | 1/1985 | Tsuchie et al. | 343/713 |
| 4,535,336 | 8/1985 | Shave | 343/713 |
| 5,541,574 | 7/1996 | Lowe et al. | 340/447 |
| 5,707,262 | 1/1998 | Huntley et al. | 440/61 |

*Primary Examiner*—Daniel J. Wu
*Attorney, Agent, or Firm*—David P. Gordon; David S. Jacobson; Thomas A. Gallagher

[57] ABSTRACT

A radio communication system for a vehicle, which may act as an interrogation unit monitoring for the presence of a valid transponder or may act as a transponder to an external interrogation unit, includes an aerial incorporated in the circumferential part of the steering wheel of the vehicle and an on-board electronic system mounted in at least one spoke and/or in the central hub part of the steering wheel.

14 Claims, 2 Drawing Sheets

COMMUNICATION SYSTEM FOR VEHICLES WITH AERIAL INCORPORATED IN STEERING WHEEL

BACKGROUND OF THE INVENTION

The present invention relates to a communication system, and more particularly but not solely to a recognition or identification system, for use in a vehicle.

A system in accordance with the invention may be arranged to enable communications between a unit mounted within a vehicle and a remote device, for example to enable access to the vehicle and/or to disarm a security system of the vehicle. The system may instead or additionally enable a remote device to identify the vehicle, for example to control access of the vehicle to a corresponding area or to levy a toll.

It is of course known to provide recognition systems in which a device external to the vehicle communicates with a unit within the vehicle, using low frequency radio signals. However, such signals are prone to being affected due to the presence of iron used in the vehicle structure: it is generally difficult to select a position within the vehicle at which to site the vehicle transmitter or receiver aerial.

SUMMARY OF THE INVENTION

We have now devised a communication system which overcomes the above-described difficulties.

In accordance with the present invention, there is provided a communication system for a vehicle, which includes an aerial incorporated in the circumferential part of the vehicle steering wheel.

It will be appreciated that the steering wheel provides a convenient site for the aerial, being a site within the vehicle and therefore inaccessible for tampering from the outside, and well away from the metal structures of the vehicle yet prominently situated for communication with it from the exterior by way of radio signals. The aerial may extend around the whole of the circumferential part of the steering wheel, or only along a portion thereof.

Preferably the communication system comprises an on-board system and one or more remote devices which may be situated within the vehicle or external to it.

The electronic circuitry of the on-board system may be mounted in at least one of the spoke and/or in the central hub part of the steering wheel: this provides a mechanically secure mounting for the circuitry. This circuitry may include a visual display to provide information to an occupant of the vehicle or to a person or persons outside the vehicle.

Preferably the on-board system comprises means for transmitting a coded radio frequency signal via the aerial to a remote device.

Preferably the on-board system comprises means for receiving a coded radio frequency signal from one or more remote devices.

Preferably the on-board system comprises data processing means, e.g. a microprocessor or ASIC, which preferably communicates with one or more vehicle sub-systems, such as the engine management system and the vehicle security system. Preferably the data processing means comprises a non-volatile program and data storage memory.

Preferably the on-board system comprises means to provide visual and auditory output signals to the driver of the vehicle via the steering wheel.

In a first preferred embodiment of the present invention, the on-board system originates a coded radio frequency signal which is detected by the or each remote device. The or each remote device may display or operate upon information transmitted to it from the on-board system, using appropriate display or data processing means, or may behave as a transponder by responding to the on-board system with an appropriate coded radio frequency signal. This response signal may then be operated upon by the on-board system.

In a second preferred embodiment of the present invention, the or each remote device originates the initial coded radio frequency signal which is detected by the on-board system. In response to this signal, the on-board system causes certain operations to be performed within the vehicle, or may behave as a transponder by responding to the remote device with an appropriate coded radio frequency signal. This response signal may then be operated upon by the remote device.

In each of the preferred embodiments, the on-board system may be arranged to identify a remote device to disable a vehicle's alarm system and/or engine immobiliser and/or release the vehicle's door locking mechanism.

The on-board system may instead, or additionally, store data relating to the vehicle, which may be transmitted to a remote interrogation device. The remote interrogation device may comprise, for example, a motorway toll station or a parking lot access controller which respectively interrogate the onboard system to determine the identity of the vehicle so that a toll may be levied or access authorisation verified. A toll may be levied, for example, by debiting a value stored in the on-board system. The on-board system display is preferably arranged to display data to the occupant regarding the toll which is taken and the remaining credit which is stored. Preferably the on-board system is arranged so that, before a toll is charged or stored credit is debited, the on-board system checks the identity of the external interrogation unit for validity.

The data stored by the on-board system may also comprise mechanical information such as the vehicle's mileage and fuel consumption or the condition of one or other of its components. The vehicle's details and service history may be stored by the on-board system and may be accessed or modified by an approved mechanic having a appropriate remote device.

The on-board system may continuously monitor such conditions as speed and distance driven over a period of time, so that the on-board system may be used in place of a conventional tachometer, or act as a 'black box' in the event of an accident.

The remote device preferably comprises a portable unit having various data items stored therein. The data may comprise, for example, an authorisation code to allow the remote device to download data from the on-board system or to enable/inhibit one or other of the vehicle's systems. One possibility would be for the on-board system to respond to a particular coded signal by stalling the engine of a vehicle. A remote device programmed with this code may then be used by police engaged in the pursuit of a vehicle.

The on-board system may be arranged to recognise more than one authorisation code to enable access to different vehicle data items or functions. For example, one person's remote device may enable use of all of the vehicle's systems, whilst another person's device may enable only the radio, mobile phone, etc. to be used.

The remote device thus described may be used as a driving licence and so store personal information such as the driver's name, address and insurance details, as well as details of any driving convictions, etc. A suitably programmed remote device may prevent a learner driver, or a driver having been convicted of speeding, from exceeding a predefined speed limit or from operating certain high-powered vehicles.

Where a vehicle is available for use by a number of people, for instance as a pool car, hire car or other commercial vehicle, the on-board system is preferably arranged to log the identity of the person operating the vehicle, together with information such as the period during which the vehicle was used, the distance that was covered in that period, or (using a satellite or terrestrial positioning system) the route taken by the vehicle.

The remote device may also be used to program or reprogram the memory of the on-board system, or to transfer credit to the system. Alternatively, such data may be exchanged via a smart card, swipe card or other form of data transfer device, or by radio communication. The same arrangements may be used for downloading data from the on-board system, providing the interrogating system is identified and validated by the on-board system.

Embodiments of the present invention will now be described by way of examples only and with reference to the accompanying drawings.

DETAILED DESCRIPTION OF THE PREFERRED EMBODIMENTS

Figure 1:
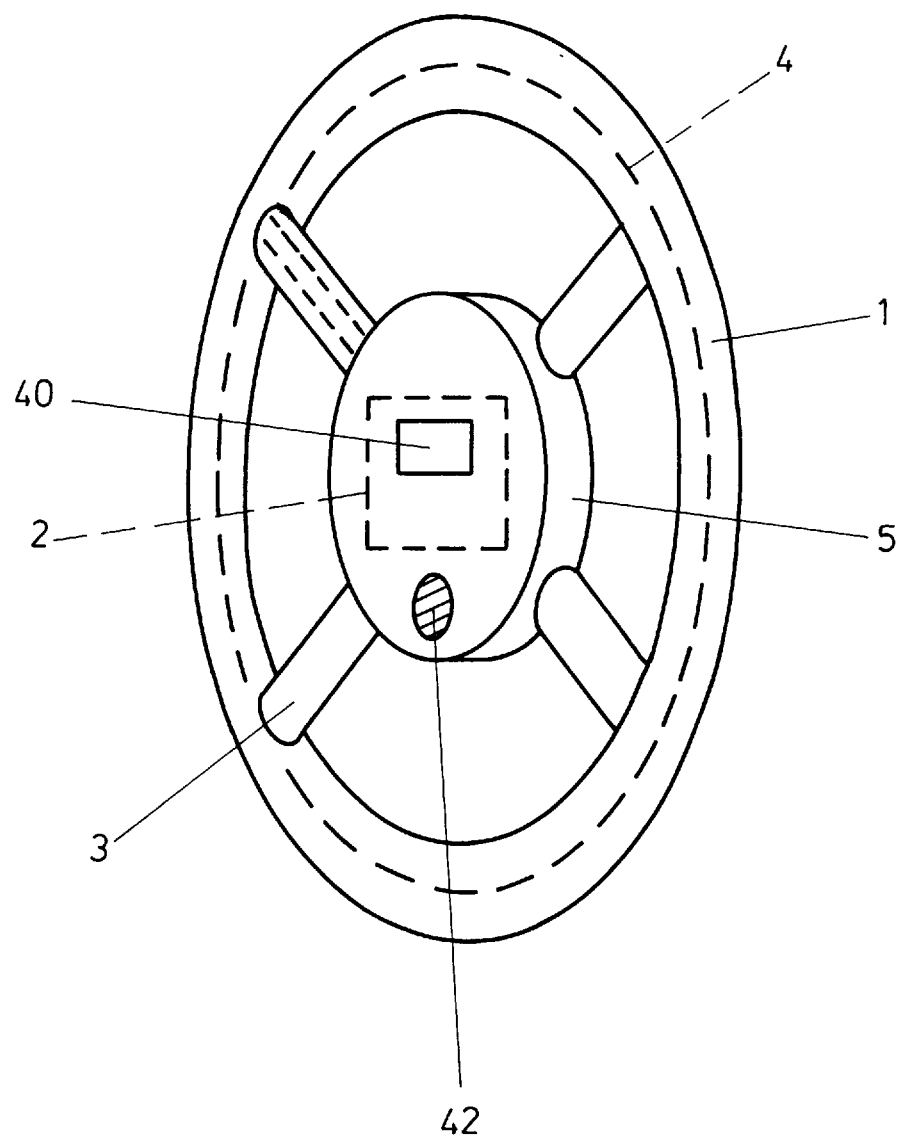
FIG. 1 is a view of a vehicle steering wheel in which a system in accordance with the present invention is mounted; and, FIG. 2 is a block diagram of the system included in the steering wheel of FIG. 1.
Figure 2:
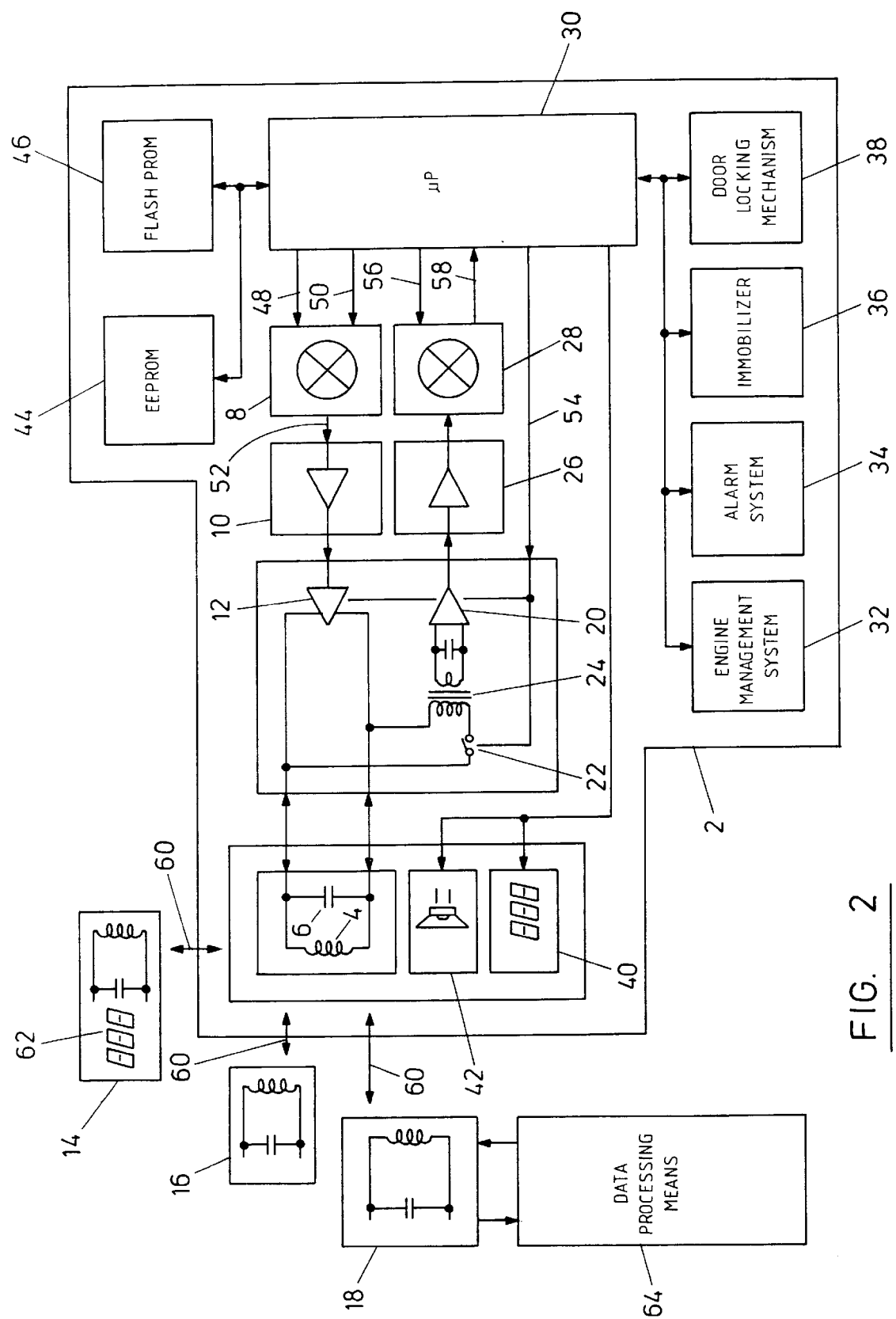

Referring to the drawings, there is shown a recognition or identification system for a vehicle, the on-board system 2 comprising a coil 4 which forms an aerial and is incorporated in the circumferential part 1 of the steering wheel. The remainder of the on-board system is mounted in the spokes 3 and/or hub 5 of the steering wheel, and comprises a capacitor 6 for tuning the aerial and means 8,10,12 for transmitting a coded radio frequency signal via the aerial to a remote device e.g. 14,16,18. The on-board system 2 also comprises means 20,22,24,26,28 for receiving a coded radio frequency signal from one or more remote devices e.g. 14,16,18.

The on-board system 2 further comprises data processing means 30, e.g. a microprocessor or ASIC, which communicates with a variety of other systems within the vehicle, such as the engine management system 32 and the vehicle security system 34,36,38, and means 40,42 to provide visual and auditory output signals to the driver of the vehicle via the steering wheel. The data processing means 30 includes or has access to a non-volatile program and data storage memory which may be, for example, EEPROM memory 44 or 'flash' PROM memory 46.

To transmit a signal using the on-board system illustrated, coded binary data 48 is first supplied from the data processing means 30 to a modulator 8, which phase modulates the data onto a carrier 50. The resulting signal 52 is then amplified and shaped by a bandpass filter 10, before being supplied to the coil 4 via a power amplifier 12.

A received signal is coupled to a pre-amplifier 20 by an electronic switch 22 and an isolating transformer 24. The switch 22 is operated according to a signal 54 supplied from the data-processing means 30 to prevent the pre-amplifier 20 from operating whilst data is being transmitted by the on-board system. The signal from the pre-amplifier 20 is amplified and shaped by a bandpass filter 26, and then fed to a demodulator 28 which, using a reference signal 56 supplied by the data processing means 30, extracts a coded binary signal 58 to be operated upon by the data processing means.

The overall system is able to operate in a number of different modes which are characterised by the protocol used to communicate between the on-board system and the remote devices.

In a first embodiment, the on-board system 2 originates a coded radio frequency signal 60 which is detected by a remote device e.g. 14,16,18 in the nearby vicinity. The remote device may display or operate upon information transmitted to it from the on-board system 2, using appropriate display 62 or data processing means 64, or may behave as a transponder by responding to the on-board system with an appropriate coded radio frequency signal. This response signal may then be operated upon by the on-board system.

In an alternative embodiment, a remote device e.g. 14,16,18 originates the initial coded radio frequency signal 60 which is detected by the on-board system 2. In response to this signal, the on-board system causes certain operations to be performed within the vehicle, or may behave as a transponder by responding to the remote device with an appropriate coded radio frequency signal. This response signal may then be operated upon by the remote device.

A number of applications are envisaged for the system described, the complexity of the system varying according to the level of control and data transfer required.

For example, the on-board system may be arranged simply to identify a remote device to disable a vehicle's alarm system 34 or engine immobiliser 36 and release the vehicle's door locking mechanism 38.

A more sophisticated version of the on-board system may also store data relating to the vehicle, which may be transmitted to a remote interrogation device. The remote device may comprise, for example, a motorway toll station or a parking lot access controller which respectively interrogate the on-board system to determine the identity of the vehicle so that a toll may be levied or access authorisation verified.

We claim:

1. A communication system for a vehicle, said vehicle having a steering wheel which has a circumferential part and a central hub part, and said communication system comprising an aerial incorporated in said circumferential part of said steering wheel and further comprising an on-board system connected to said aerial.

2. A communication system as claimed in claim 1, in which said on-board system comprises electronic circuitry which is mounted in at least one spoke of said steering wheel.

3. A communication system as claimed in claim 1, in which said electronic circuitry of said on-board system includes a visual display to provide information at least to an occupant of the vehicle.

4. A communication system as claimed in claim 1, in which said on-board system comprises electronic circuitry which is mounted in said central hub part of said steering wheel.

5. A communication system as claimed in claim 1, in which said on-board system includes means for detecting a coded radio frequency signal transmitted from a remote device and received via said aerial.

6. A communication system as claimed in claim 5, in which said on-board system includes means to recognize at least one predetermined command signal received from said remote device and control at least one sub-system of the vehicle in accordance therewith.

7. A communication system as claimed in claim 1, in which said on-board system includes means for generating a coded radio frequency signal and transmitting this signal via said aerial to at least one remote device.

8. A communication system as claimed in claim 7, in which said on-board system includes means to detect a response signal transmitted by a said remote device in response to a said radio frequency signal transmitted via said aerial.

9. A communication system as claimed in claim 7, in which said on-board system includes memory means storing data relating to the vehicle and means for transmitting selected said data via said aerial in response to a predetermined inquiry signal received from a said remote device.

10. A communication system as claimed in claim 9, in which said on-board system comprises means responsive to a predetermined control signal received via said aerial to reprogram said memory means.

11. A communication system as claimed in claim 9, in which said on-board system comprises a port for transferring data to or from said memory means.

12. A vehicle steering wheel which comprises a circumferential part and a central hub part and which includes a communication system having an aerial incorporated in said circumferential part.

13. A vehicle steering wheel as claimed in claim 12, in which said communication system comprises electronic circuitry mounted in at least one spoke of said steering wheel.

14. A vehicle steering wheel as claimed in claim 12, in which said communication system comprises electronic circuitry mounted in said central hub part of said steering wheel.

* * * * *